United States Patent [19]

Faiola et al.

[11] Patent Number: 5,701,747
[45] Date of Patent: Dec. 30, 1997

[54] AUTOMATIC RAPID CHILLING SYSTEM

[75] Inventors: Norman A. Faiola, Ithaca, N.Y.; Christopher J. Crase, Monument, Colo.

[73] Assignee: Syracuse University, Syracuse, N.Y.

[21] Appl. No.: 742,065

[22] Filed: Oct. 31, 1996

[51] Int. Cl.[6] .................................................. A23G 9/12
[52] U.S. Cl. .................................. 68/63; 62/342; 62/529; 165/92; 366/144
[58] Field of Search .......................... 62/342, 68, 457.2, 62/529; 366/144; 165/92

[56] References Cited

U.S. PATENT DOCUMENTS

| | | |
|---|---|---|
| 567,726 | 9/1896 | Roberts et al. . |
| 723,977 | 3/1903 | Barney . |
| 913,986 | 3/1909 | Sharp . |
| 915,310 | 3/1909 | Rickman ................... 366/282 |
| 1,141,762 | 6/1915 | Brown ........................ 165/92 |
| 1,421,932 | 7/1922 | Foster ........................ 366/249 |
| 1,573,760 | 2/1926 | Black . |
| 1,595,684 | 8/1926 | Olson . |
| 1,742,878 | 1/1930 | Rosenberg . |
| 1,831,499 | 11/1931 | Losee . |
| 2,007,361 | 7/1935 | Berger . |
| 2,805,843 | 9/1957 | Block . |
| 3,011,768 | 12/1961 | Clark . |
| 3,357,685 | 12/1967 | Stephens . |
| 4,091,632 | 5/1978 | Marchewka et al. .............. 62/1 |
| 4,741,174 | 5/1988 | Uesaka ........................ 62/529 |
| 4,993,238 | 2/1991 | Inagaki ....................... 62/342 |
| 5,058,396 | 10/1991 | Faiola ....................... 62/457.2 |
| 5,372,422 | 12/1994 | Dubroy ...................... 366/143 |

*Primary Examiner*—William E. Tapolcai
*Attorney, Agent, or Firm*—Harris Beach & Wilcox, LLP

[57] ABSTRACT

A system for automatically rapidly chilling liquids and semisolids which includes a frame which supports a drive motor which contains a substantially vertical drive shaft having a connecting member at one end. A sealed, hollow chilling utensil which contains a refrigerant, and which has a neck portion which contains a connecting member which is adapted for fixed engagement with the connecting member of the drive shaft.

4 Claims, 4 Drawing Sheets

AUTOMATIC RAPID CHILLING SYSTEM

FIELD OF THE INVENTION

This invention relates generally to cooling foods, and more specifically to a system for automatically rapidly chilling comestibles.

BACKGROUND OF THE INVENTION

This invention relates to a system for rapidly cooling comestibles which are in a liquid or a semisolid state, and which are contained or stored in an open receptacle such as a bowl.

If certain foods are allowed to remain warm, they will offer a favorable environment for harmful bacteria that can proliferate rapidly. These organisms may generate toxins as they multiply and they will survive while the food is in storage. Subsequent consumption of such contaminated food may introduce dangerous toxins and viable infective organisms into the alimentary tract and cause illness or death. Cooking the food prior to consumption will not completely avoid the risk of harm. While most of the bacteria will not survive the cooking process, some bacterial toxins are not inactivated by heat.

Since bacteria cannot grow at low temperatures, it is important to rapidly chill potentially hazardous foods prior to refrigerated storage, thus minimizing the risk of human illness. Many health codes require that potentially hazardous food be immediately chilled so that chilling is complete and no isolated warm regions remain in the food. In facilities which manufacture food products or serve large numbers of people, it is necessary to store food under circumstances where storage is at a premium.

A number of devices for chilling beverages and the like are known. U.S. Pat. No. 1,923,522 to Whitehouse discloses a biconcave box of celluloid or other flexible plastic material which can be filled with water and frozen. The frozen box can then be placed in a beverage where it will either lie submerged or will float on the surface and absorb heat energy from the beverage. U.S. Pat. No. 4,325,230 to Driscoll et al. discloses a rigid plastic cube filled with water which can be frozen and placed in a liquid to be cooled. U.S. Pat. No. 4,761,314 to Marshall shows a plastic shell filled with a medium which freezes at about the freezing temperature of water and is to be placed in a beverage or other liquid to be cooled. This shell has a complex shape, and is provided with numerous projections and invaginations to increase the surface area in contact with the liquid to be chilled.

These prior art devices all cool the liquid passively and must eventually be extracted by some instrumentality that comes in contact with the chilled liquid. In the case of food, such a procedure risks introducing bacterial contamination and is therefore extremely undesirable and potentially dangerous. Furthermore, these devices lie motionless in the material being cooled. Their cooling effect is greatest immediately adjacent the device and dissipates rapidly with the distance from the device. Bacteria can thus grow in regions which are remote from the device and shielded from the cooling influence thereof.

U.S. Pat. No. 1,758,008 to Mock shows a refrigerating device in which a container enclosing a refrigerant has a handle to allow a user to submerge the container in a liquid to be cooled and stir the same. The unit has a relatively enlarged refrigerating container and a narrow elongated handle. This device is suitable for refrigerating a material in a relatively large receptacle, but is too bulky for convenient insertion into shallow containers which are arranged in closely spaced vertical banks. Furthermore, this device requires the refrigerant to communicate with the ambient air through a hole in the handle. This device is suitable for vertical insertion into a container, but its use in food storage in other than a vertical position would be unsafe because refrigerant could flow out of the device through the handle and could contaminate the food.

Applicant's U.S. Pat. No. 5,058,396 teaches a hand-operated system for cooling comestibles which are contained in multiple tiers of relatively shallow trays or receptacles with one or more hollow wands containing refrigerant. The wand can be periodically or continuously manipulated in twirling, revolving and translating motions which simultaneously mix the food and agitate the refrigerant so that the refrigerant circulates within the interior of the wand and quickly cools the food.

U.S. Pat. Nos. 3,011,768, 3,357,685 and 5,372,422 disclose automatic apparatus for stirring food but do not provide for any cooling means. U.S. Pat. Nos. 2,007,361 and 2,805,843 also show automatic stirring apparatus for stirring foods or beverages which are driven by spring motors. These patents, however, do not provide for cooling or chilling means which reduce the temperature of the food or beverage being stirred.

Typical food products which must be rapidly cooled to avoid the risk of contamination include soups, sauces, chili and gravy. Under current FDA Regulations, a food product must be cooled from 140° F. to 70° F. within 2 hours and from 70° F. to 40° F. within an additional 4 hours.

In view of the state of the prior art, it can be seen that there is a need in the field for an automatic chilling device that effectively reduces cooling time, and when in operation, does not require human intervention.

It is therefore a primary object of the present invention to provide an improved automatic system for rapidly chilling comestibles.

It is a further object of the present invention to provide a system which promotes greater safety in food preparation and storage.

SUMMARY OF THE INVENTION

The above objects of the invention are achieved by providing an automatic system for rapidly chilling comestibles. The system includes an automatic stirrer for a rapid chilling utensil which in operation is immersed in a suitable container or receptacle such as open bowl. The rapid chilling utensil comprises an elongated hollow receptacle which contains a refrigerant. The chilling utensil is preferably made out of any suitable plastic material readily available to the art. Typical materials include polystyrene, polyethylene and polypropylene. The receptacle contains a detachable sealing cap to facilitate filling the receptacle with the appropriate refrigerant. The cap further contains a suitable connection for attachment to a drive shaft driven by a suitable source of power such as an electric motor or the like. The drive shaft is suitably positioned for entry of the receptacle into an open bowl containing a suitable food product to be chilled. In operation, the receptacle is inserted into the food container to the appropriate level, and the chilling utensil rotated at an appropriate pre-determined speed to cause the food product to be cooled to the appropriate temperature automatically, without human intervention.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION OF THE INVENTION

Figure 1:
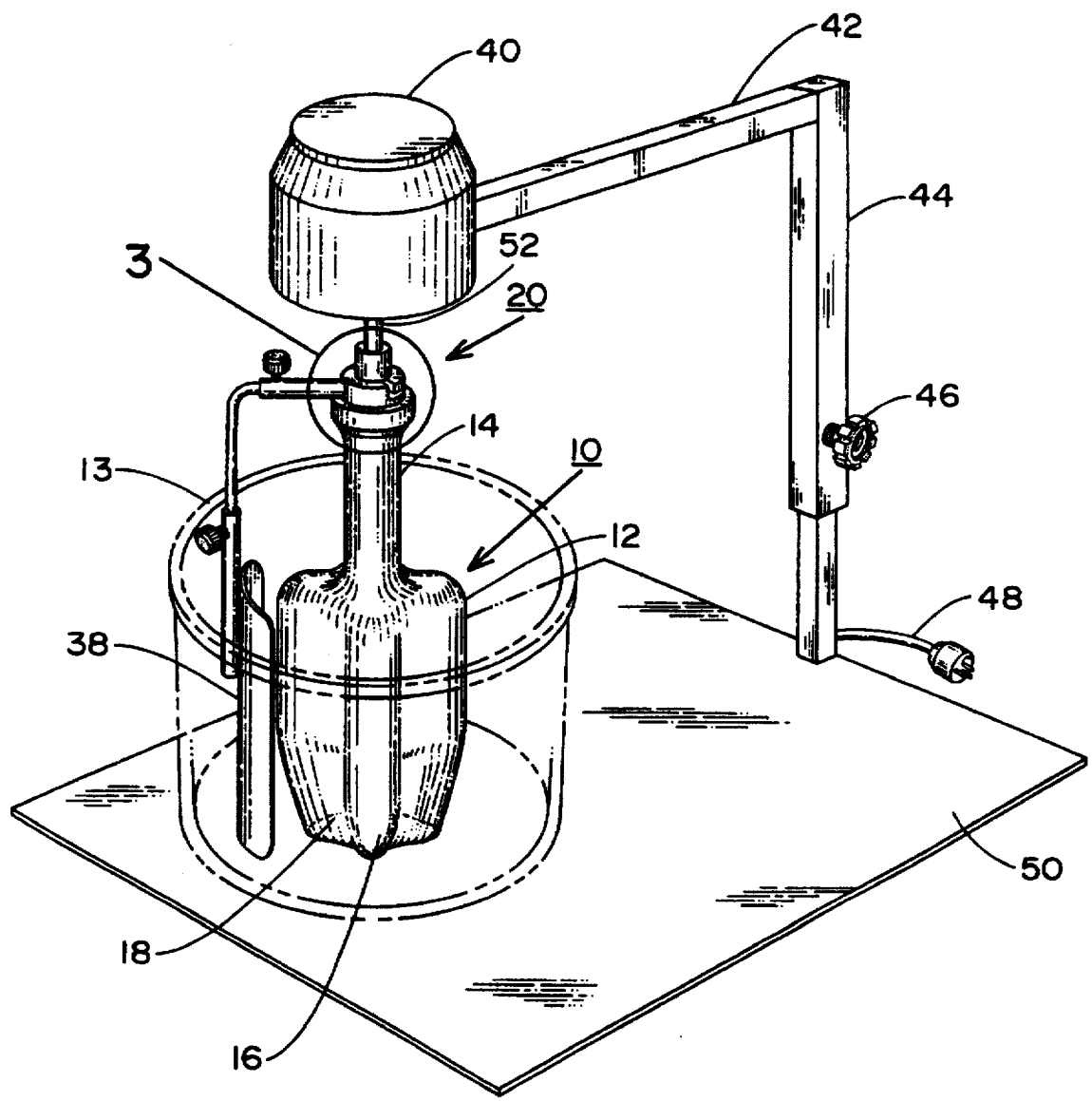
FIG. 1 is a perspective view of one embodiment of the present invention.
Figure 3:
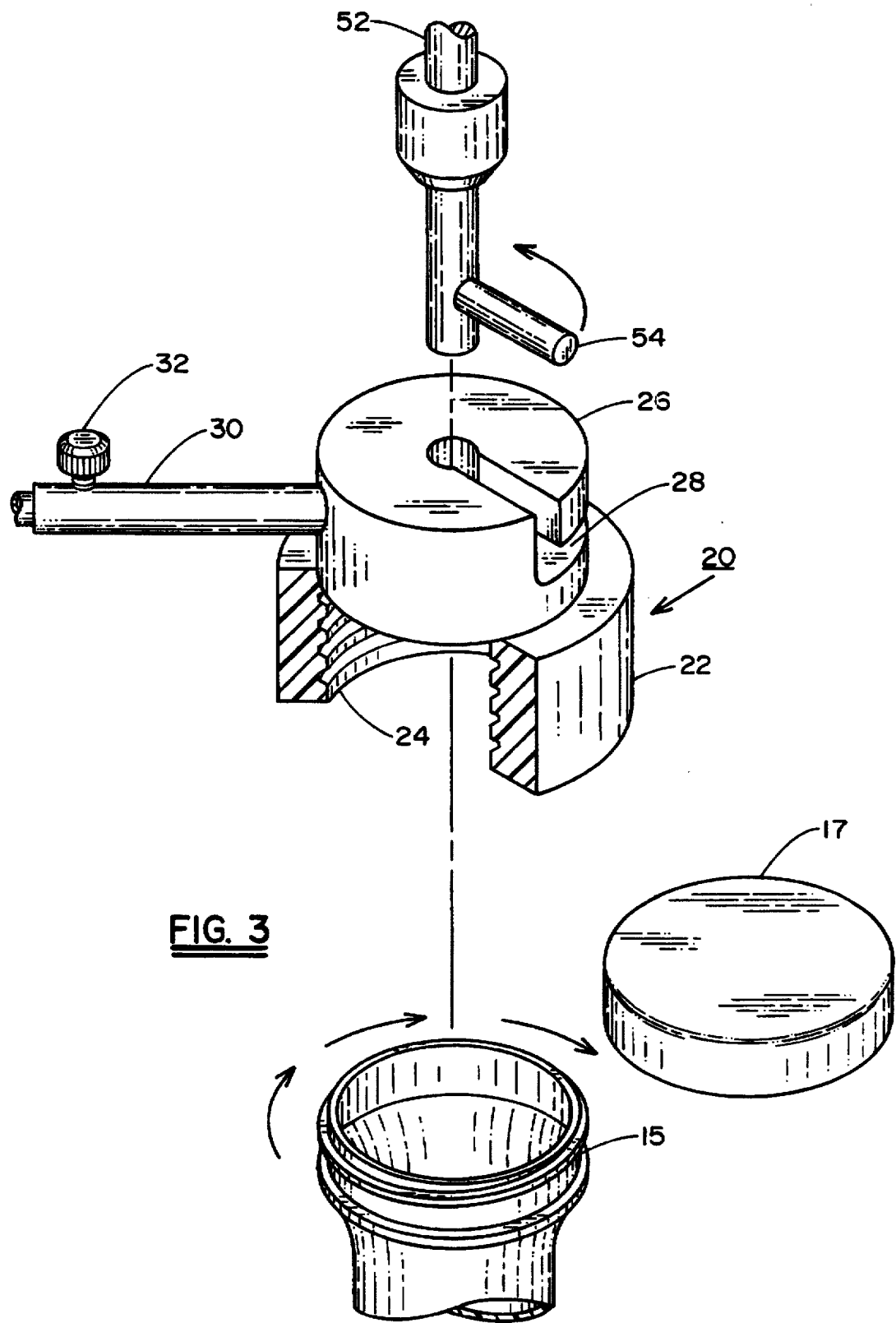
FIG. 3 is an enlarged view of section 3 of FIG. 1 illustrating the detail of the connecting cap structure.
Figure 4:
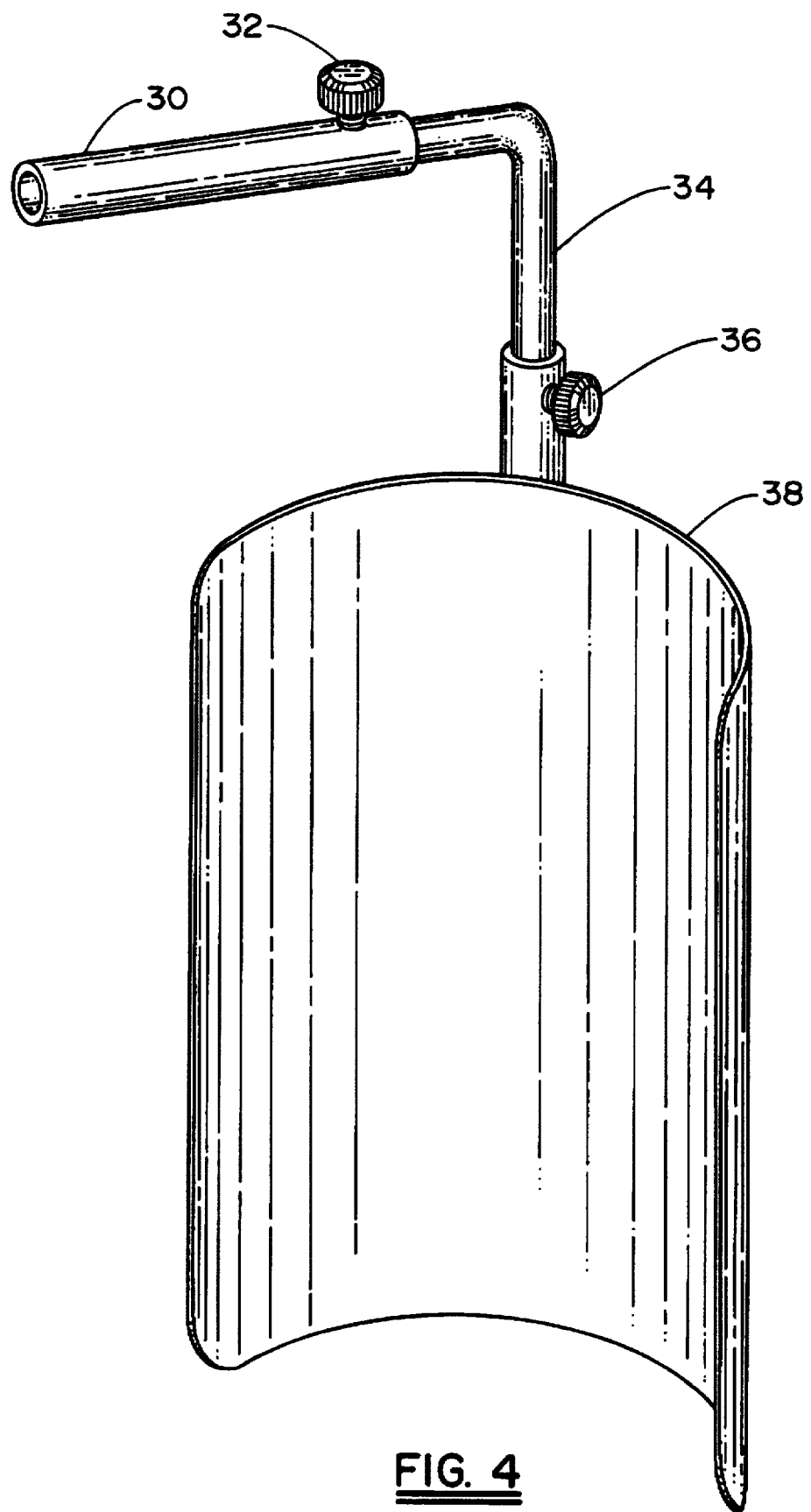
FIG. 4 is an enlarged view of the scraper assembly shown in FIGS. 1 and 2.

Referring to the drawings as shown in FIG. 1, the chilling utensil 10 comprises a hollow body portion 12 designed to receive and hold a refrigerant. The utensil contains a neck portion 14 and a threaded end portion 15 which may be sealed with cap 17 when the utensil is not in use (see FIG. 3). The utensil is designed to be used with a threaded sealing cap 20 which is designed to be connected in fixed engagement to drive shaft 52 of an electric motor 40. Cap 20 and drive shaft 52 are connected to each other in fixed engagement by slot 28 which is engaged with member 54 as more clearly shown in FIG. 3.

Electric motor 40 is mounted on support brackets 42 and 44 and is adjustable in heighth by adjusting screw 46. Optionally, a scraper plate 38 may be fixed to the sealing cap 20 by brackets 34. The scraper plate 38 functions to prevent the comestibles from layering or sticking to the sides of the bowl 13 during the cooling process. The chilling utensil is preferably designed to have a series of ridges 16 and grooves 18 in its outer surface in order to provide for a greater surface area and enhance the cooling function of the utensil. U.S. Pat. No. 5,058,396 shows in greater detail suitable geometries for the chilling utensil which may be used in the present invention, and is incorporated herein by reference.

In operation, the chilling utensil 10 is filled with an appropriate refrigerant, for example, water which is frozen. Cap 20 is then screwed on the top of the neck of the utensil. The chilling utensil is then affixed to the drive shaft through slot 28 through member 54 as shown by the directional arrow in FIG. 3. Brackets 42 and 44 are then adjusted to position the chilling utensil in a bowl 13 containing the comestible to be chilled. The electric motor 40 is then started and the utensil 10 rotated at an appropriate speed to cool the food product to the desired temperature. A speed of about 30 rpms has been found to be satisfactory.

Figure 2:
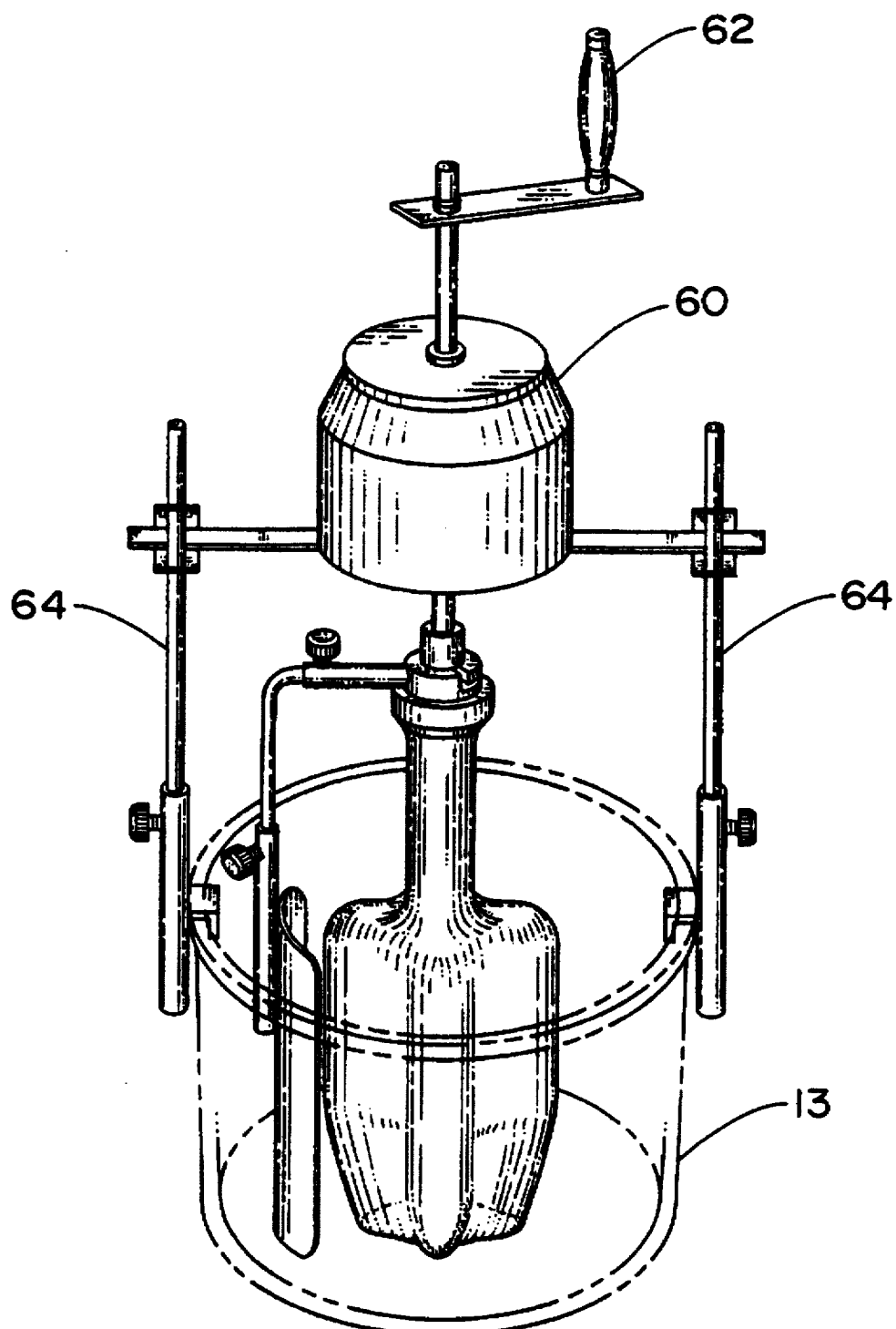
FIG. 2 is a perspective view of a second embodiment of the present invention.

In an alternative embodiment, a spring wound motor 60 which is wound through handle 62 may be used in the place of an electric motor for certain applications. This embodiment is shown in FIG. 2. As illustrated in this embodiment, a bracket 64 is attached to the side of the bowl 13. Any suitable spring-operated motor may be used in this application such as those disclosed in either of U.S. Pat. Nos. 2,007,361 or 2,805,843 which are incorporated herein by reference.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A system for automatically rapidly chilling liquids and semisolids which comprises:
   (a) a support frame which includes a drive motor which contains a substantially vertical drive shaft having a connecting member at its distal end; and
   (b) a sealed hollow chilling utensil which contains a cold refrigerant having a neck portion which contains a connecting member which is adapted for fixed engagement with the connecting member of said drive shaft such that immersing the chilling utensil into a food product and rotating the chilling utensil rapidly cools the food product.

2. The system of claim 1 in which the connecting member of the chilling utensil comprises a threaded cap which contains connecting means at its top surface.

3. The system of claim 2 in which connecting means comprises a slot which is adapted to receive a locking member contained on the distal end of the drive shaft.

4. A method for automatically rapidly chilling liquids and semisolids which comprises:
   (a) providing a frame which supports a motor which contains a drive shaft having a connecting member at its distal end;
   (b) connecting a sealed hollow elongated chilling utensil containing a refrigerant to the connecting member of said drive shaft;
   (c) immersing said chilling utensil into a food product to be cooled; and
   (d) rotating said chilling utensil on said drive shaft for a time sufficient to rapidly cool said food product to a desired predetermined temperature.

* * * * *